United States Patent
Peroulas

(10) Patent No.: US 8,995,515 B2
(45) Date of Patent: Mar. 31, 2015

(54) DYNAMICALLY ADJUSTED OFDM CHANNEL ESTIMATION FILTERING IN OFDM COMMUNICATIONS

(75) Inventor: James Peroulas, University City, MO (US)

(73) Assignee: ZTE Wistron Telecom AB, Stockholm (SE)

(*) Notice: Subject to any disclaimer, the term of this patent is extended or adjusted under 35 U.S.C. 154(b) by 369 days.

(21) Appl. No.: 13/339,321

(22) Filed: Dec. 28, 2011

(65) Prior Publication Data

US 2012/0170635 A1  Jul. 5, 2012

Related U.S. Application Data

(60) Provisional application No. 61/428,219, filed on Dec. 29, 2010.

(51) Int. Cl.
| | | |
|---|---|---|
| *H04B 3/46* | (2006.01) | |
| *H04B 17/00* | (2006.01) | |
| *H04Q 1/20* | (2006.01) | |
| *H04L 25/02* | (2006.01) | |
| *H04L 27/26* | (2006.01) | |

(52) U.S. Cl.
CPC ........ *H04L 25/0212* (2013.01); *H04L 25/0224* (2013.01); *H04L 27/2647* (2013.01)
USPC ............ 375/227; 375/224; 375/260; 375/350

(58) Field of Classification Search
USPC .................................. 375/227, 224, 260, 350
See application file for complete search history.

(56) References Cited

U.S. PATENT DOCUMENTS

| | | | |
|---|---|---|---|
| 2007/0110172 A1 | 5/2007 | Faulkner et al. | |
| 2008/0137788 A1 | 6/2008 | Bang et al. | |
| 2009/0252026 A1 | 10/2009 | Yousef | |
| 2010/0309958 A1 | 12/2010 | Lakkis | |
| 2011/0026619 A1* | 2/2011 | Kent et al. | ...................... 375/260 |
| 2011/0051618 A1* | 3/2011 | Li et al. | .......................... 370/252 |
| 2012/0170630 A1 | 7/2012 | Peroulas et al. | |

FOREIGN PATENT DOCUMENTS

| | | |
|---|---|---|
| CN | 1890935 | 1/2007 |
| CN | 101325568 | 12/2008 |

OTHER PUBLICATIONS

Anna Engelbert; Carl Hallqvist; "Digital filters, Computable efficient recursive filters," Master of Science Thesis in Signal Processing, Department of Signal and systems, Chalmers University of Technology, Gothenburg, Sweden, 2008, Report No. EX057/2008.*

(Continued)

*Primary Examiner* — Shuwang Liu
*Assistant Examiner* — Nader Bolourchi
(74) *Attorney, Agent, or Firm* — Perkins Coie LLP

(57) ABSTRACT

Techniques for performing channel estimation in an orthogonal frequency domain multiplexing (OFDM) communications system include receiving a plurality of reference signals on a plurality of subcarriers, performing channel estimation to obtain a plurality of raw channel estimates based on the received plurality of reference signals, determining a number of raw channel estimates to be used for a channel estimate refinement and calculating a refined channel estimate using the number of raw channel estimates from the plurality of raw channel estimates.

17 Claims, 9 Drawing Sheets

(56) References Cited

OTHER PUBLICATIONS

Extended Search Report dated Mar. 30, 2012 from European Patent Application No. 11010290.2, filed on Dec. 29, 2011 (7 pages).
Extended Search Report dated May 8, 2012 from European Patent Application No. 11010291.0, filed on Dec. 29, 2011 (8 pages).
Mehlführer, C., et al., "An Accurate and Low Complex Channel Estimator for OFDM WiMAX," ISCCSP 2008, 3rd International Symposium on Communications, Control and Signal Processing, pp. 922-926, Mar. 12-14, 2008.
Noh, M., et al., "Low complexity LMMSE channel estimation for OFDM," IEE Proceedings Communications, 153 (5):645-650, Oct. 2006.
Office Action dated Mar. 10, 2014 from Chinese Patent Application No. 201110452499.6, filed on Dec. 29, 2011 (6 pages).
Office Action dated Mar. 26, 2014 from Chinese Patent Application No. 201110452962.7, filed on Dec. 29, 2011 (13 pages).
Vigelis, R.F., et al., "A QR Factorization Based Algorithm for Pilot Assisted Channel Estimation in OFDM Systems," ICASSP 2007, IEEE International Conference on Acoustics, Speech and Signal Processing, vol. 3, pp. 305-308, Apr. 15-20, 2007.
Yuanjin, Z., "A Novel Channel Estimation and Tacking Method for Wireless OFDM Systems Based on Pilots and Kalman Filtering," IEEE Transactions on Consumer Electronics, 49(2):275-283, May 2003.

* cited by examiner

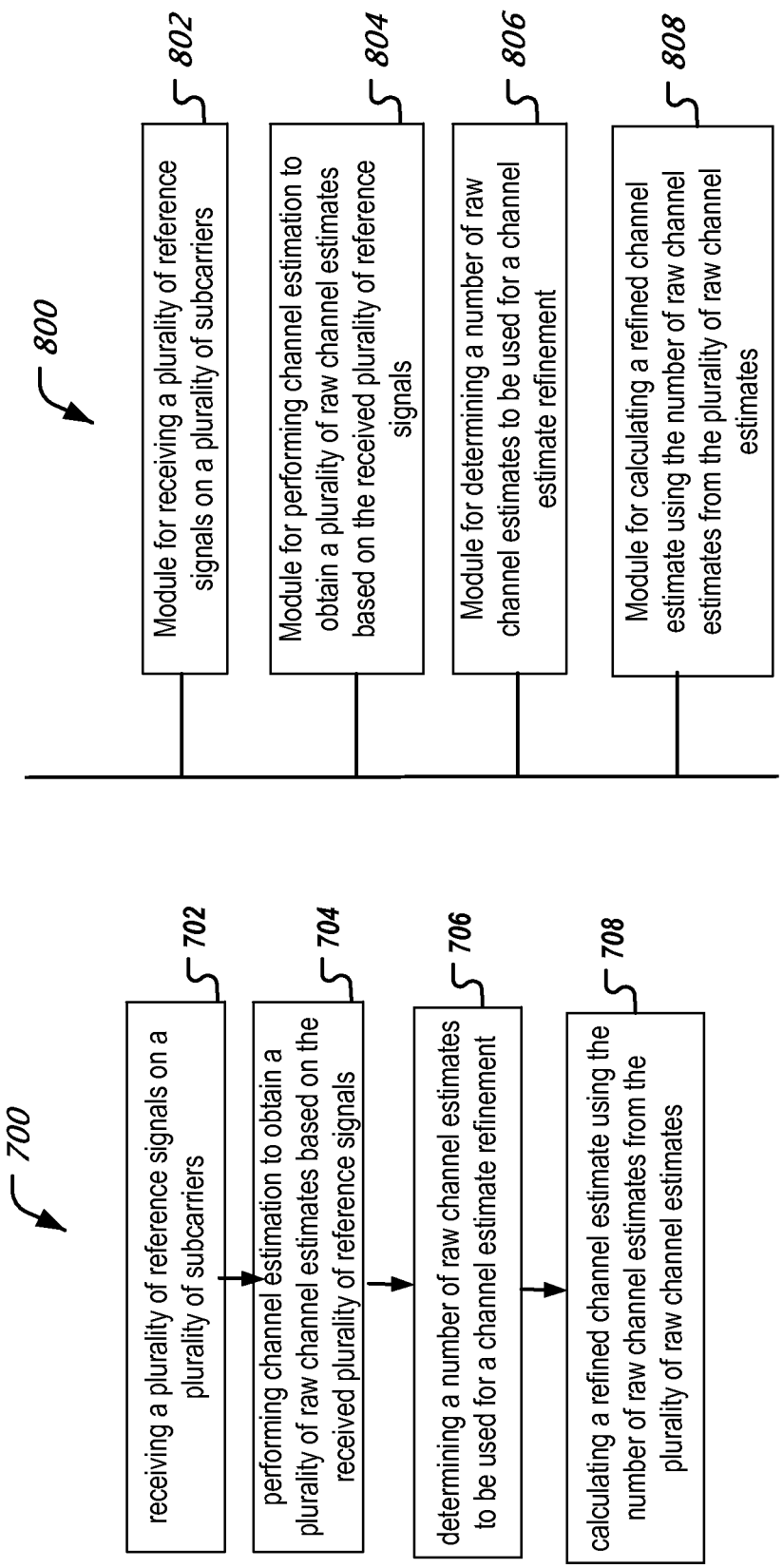

DYNAMICALLY ADJUSTED OFDM CHANNEL ESTIMATION FILTERING IN OFDM COMMUNICATIONS

CROSS REFERENCE TO RELATED APPLICATIONS

This patent document claims the benefit of priority of U.S. Provisional Patent Application No. 61/428,219, entitled "DYNAMICALLY ADJUSTED OFDM CHANNEL ESTIMATION FILTERING IN OFDM COMMUNICATIONS", filed on Dec. 29, 2010.

The entire content of the above referenced provisional patent application is incorporated by reference as a part of this patent document.

BACKGROUND

This patent document relates to wireless communications, wireless communication devices and wireless communication systems.

Wireless communication systems use electromagnetic waves to communicate with wireless communication devices located within cells of coverage areas of the systems. A radio spectral range or band designated or allocated for a wireless communication service or a particular class of wireless services may be divided into different radio carrier frequencies for generating different communication frequency channels. For a given wireless system, the communication capacity increases as the number of the communication frequency channels increases. Two different frequency channels, when placed too close to each other in frequency, can interfere or cross talk with each other to create noise and thus reduce the signal to noise ratio. One technique to reduce the minimum frequency spacing between two adjacent channels is to generate different channels within a given band by using the orthogonal frequency division multiplexing (OFDM). This technique generates channel spectral profiles that are orthogonal to one another without interference when different channels are centered at selected equally-spaced frequencies. Under the OFDM, the frequency spacing can be smaller than the minimum spacing in conventional frequency channels and hence increase the number of channels within a given band. The existing and developing specifications under IEEE 806.16x standards support wireless communications under OFDM and orthogonal frequency division multiple access (OFDMA). For example, the draft for IEEE 806.16d published in January 2004 provides technical specifications for OFDM and OFDMA wireless systems.

SUMMARY

This document describes technologies, among other things, for wireless communications, including devices, systems and methods that improve channel estimation as part of the process of decoding transmitted signals.

In one aspect, a wireless communications method is disclosed. The method includes receiving a plurality of reference signals on a plurality of subcarriers, performing channel estimation to obtain a plurality of raw channel estimates based on the received plurality of reference signals, determining a number of raw channel estimates to be used for a channel estimate refinement and calculating a refined channel estimate using the number of raw channel estimates from the plurality of raw channel estimates.

In another aspect, a communication system based on orthogonal frequency domain multiplexing (OFDM) can include a network of base stations that are spatially distributed in a service area to form a radio access network for wireless communication devices. Each base station includes a receiver module that receives a plurality of reference signals on a plurality of subcarriers; a channel estimation module that performs channel estimation to obtain a plurality of raw channel estimates based on the received plurality of reference signals; a channel estimation filter module that determines a number of raw channel estimates to be used for a channel estimate refinement; and a channel estimation refinement module that provides a refined channel estimate using the number of raw channel estimates from the plurality of raw channel estimates.

In another aspect, a wireless communications apparatus for performing channel estimation in an orthogonal frequency domain multiplexing (OFDM) communications system is disclosed. The apparatus includes a receiver module for receiving a plurality of reference signals on a plurality of subcarriers, a channel estimation module for performing channel estimation to obtain a plurality of raw channel estimates based on the received plurality of reference signals, a channel estimation filter module for determining a number of raw channel estimates to be used for a channel estimate refinement and a channel estimation refinement module for calculating a refined channel estimate using the number of raw channel estimates from the plurality of raw channel estimates.

In yet another aspect, a computer program product comprising a non-volatile computer readable medium having computer executable instructions stored thereon is disclosed. The instructions include code for facilitating receiving a plurality of reference signals on a plurality of subcarriers, performing channel estimation to obtain a plurality of raw channel estimates based on the received plurality of reference signals, determining a number of raw channel estimates to be used for a channel estimate refinement and calculating a refined channel estimate using the number of raw channel estimates from the plurality of raw channel estimates.

The details of one or more implementations are set forth in the accompanying attachments, the drawings, and the description below. Other features will be apparent from the description and drawings, and from the claims.

BRIEF DESCRIPTION OF THE DRAWINGS

FIG. 7 is a flowchart representation of a process of wireless communications.

FIG. 8 is a block diagram representation of a portion of a wireless communication apparatus.

DETAILED DESCRIPTION

OFDM receivers often require channel estimation as part of the process of decoding the signal that was transmitted. To assist the receiver in calculating the response of the channel, often, the transmitter is configured to periodically transmit a known reference signal (also known as a pilot signal) on certain subcarriers. By comparing the signal actually received to the signal known to have been transmitted, the receiver can estimate the response of the channel.

Furthermore, as in a Long Term Evolution (LTE) OFDMA uplink, it is often the case that the reference signal is configured to occupy several adjacent subcarriers. Because the channel response between adjacent subcarriers is highly correlated, the channel response from adjacent or nearby subcarriers can be combined and averaged so as to produce improved channel estimates. This is called channel estimate filtering in the frequency domain.

Filtering may be a computationally intensive operation, and in some cases, is not necessary if the signal to noise ratio of the channel estimates is acceptable without any filtering. Utilizing a static or fixed filtering algorithm may waste computational resources when its result would be to produce filtered channel estimates with a signal to noise ratio that exceeds the target performance requirement. In contrast, a dynamic channel estimate filter calculation, which varies filter length L as a function of the signal to noise ratios of the unfiltered and required filtered channel estimates, could better optimize computational resources and permit the receiver to perform channel estimate filtering on more channels at the same time.

Figure 1:
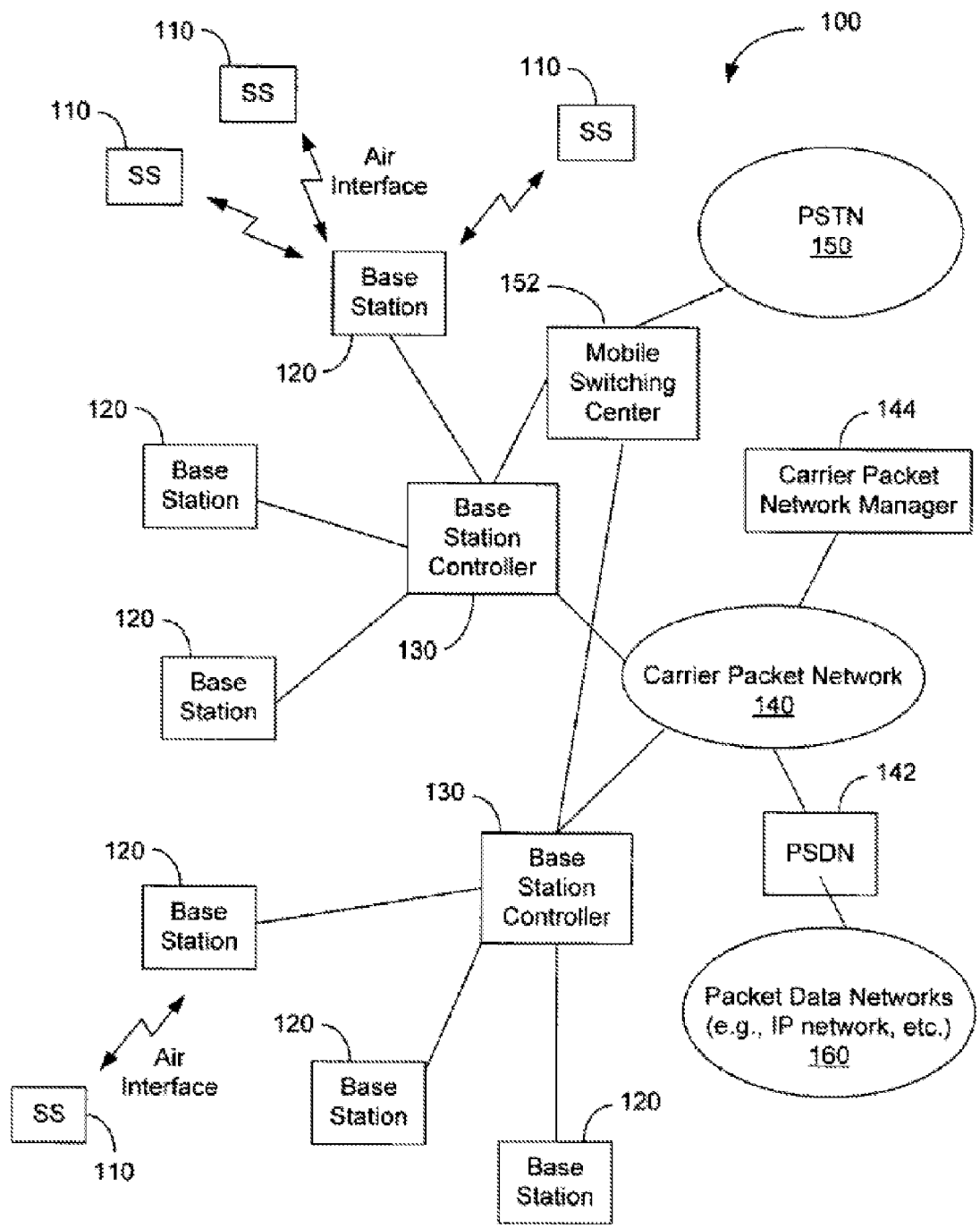
FIG. 1 shows an example of a wireless communication system.

FIG. 1 illustrates an exemplary wireless communication system 100 that uses communication channels at different frequencies under OFDM or OFDMA to provide wireless communication services based in accordance with an embodiment. The system 100 may include a network of base stations (BSs) or base station transceivers (BSTs) 120 that are spatially distributed in a service area to form a radio access network for wireless subscribers or wireless subscriber stations (SSs) 110. In some implementations, a base station 120 may be designed to have directional antennas and to produce two or more directional beams to further divide each cell into different sections. Base station controllers (BSCs) 130 are connected, usually with wires or cables, to BSs 120 and control the connected BSs 120. Each BSC 130 is usually connected to and controls two or more designated BSs 120.

The wireless system 100 may include a carrier packet network 140 that may be connected to one or more public switched telephone networks (PSTN) 150 and one or more packet data networks 160 (e.g., an IP network). A mobile switching center (MSC) 152 may be used as an interface between the BSCs 130 and the PSTN 150. A packet data serving node 142 may be used to provide an interface between the carrier packet network 140 and the packet data network 160. In addition, a carrier packet network manager 144 may be connected to the carrier packet network 140 to provide various network management functions, such as such as an AAA server for authentication, authorization, and accounting (AAA) functions.

Each subscriber station 110 may be a stationary or mobile wireless communication device. Examples of a stationary wireless device may include desktop computers and computer servers. Examples of a mobile wireless device may include mobile wireless phones, Personal Digital Assistants (PDAs), and mobile computers. A subscriber station 110 may be any communication device capable of wirelessly communicating with base stations 120.

In one embodiment, the system in FIG. 1 may be applied to the communication bands from 2 to 11 GHz under OFDM and OFDMA provided in IEEE 802.16x standards such as IEEE 802.16d (January, 2004). In OFDM and OFDMA systems, the available frequency band is divided into subcarriers at different frequencies that are orthogonal. In an OFDMA system, a subchannel is formed from a subset of subcarriers. In OFDMA, a total of 32 sub channels are allocated to each radio cell.

A base station (BSs) or base station transceiver (BSTs) 120 may include an OFDM receiver. OFDM receivers may provide channel estimation as part of the process of decoding the signal that was transmitted. To assist the receiver in calculating the response of the channel, often, the transmitter is configured to periodically transmit a known reference signal (also known as a pilot signal) on certain subcarriers. By comparing the signal actually received to the signal known to have been transmitted, the receiver can estimate the response of the channel.

Furthermore, as in a Long Term Evolution (LTE) OFDMA uplink, it is often the case that the reference signal is configured to occupy several adjacent subcarriers. Because the channel response between adjacent subcarriers is highly correlated, the channel response from adjacent or nearby subcarriers can be combined and averaged so as to produce improved channel estimates. This is called channel estimate filtering in the frequency domain.

Figure 2:
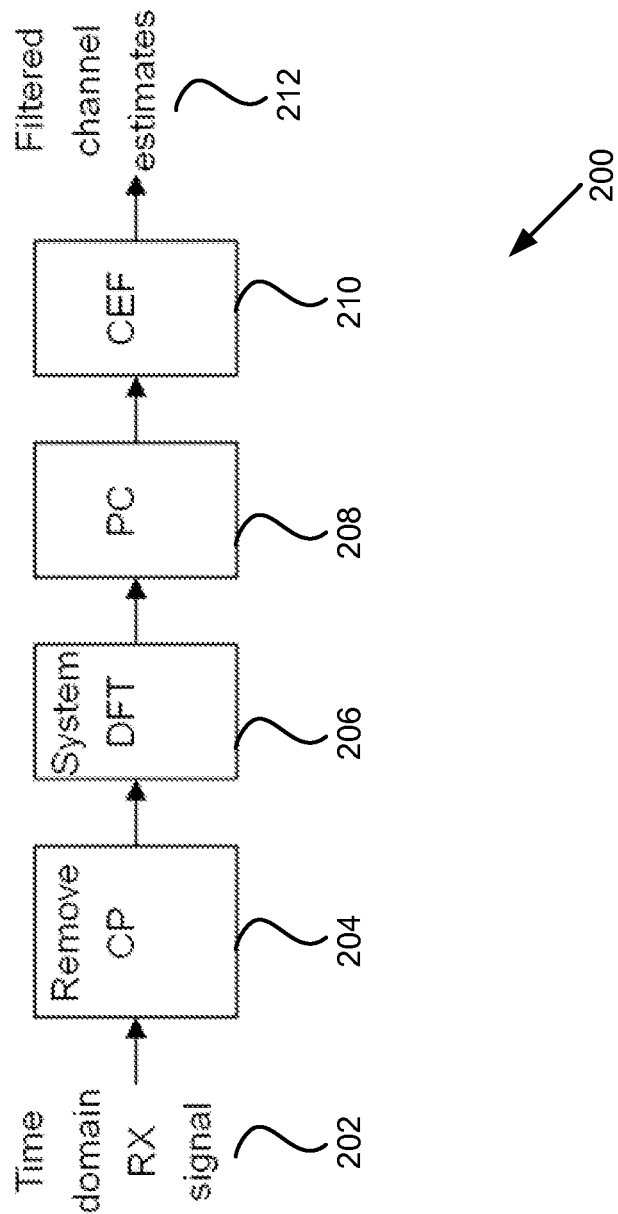
FIG. 2 shows an example of a radio station architecture.

FIG. 2 shows a schematic diagram of an exemplary OFDM receiver which performs channel estimate filtering in the frequency domain. The exemplary processing shown in system 200 to generate filtered channel estimates may be performed using any combination of hardware and software suitable to implement functionality disclosed herein. In one embodiment, the hardware may include a digital signal processor, such as a TMS320TCI6616 wireless base station system-on-a-chip from Texas Instruments Incorporated of Dallas, Tex. The digital signal processor may be configured with processor executable instructions. The processor executable instructions may be stored in random access memory (RAM) within or in communication with the digital signal processor, or non-volatile memory within or in communication with the digital signal processor, such as a read-only memory (ROM), EEPROM (Electrically Erasable and Programmable Read Only Memory), or E-flash (embedded flash). The executable instructions that configure the digital signal processor may implement a number of software modules or applications that communicate with one another and with hardware and software inside and outside of base station, in order to implement the functions of an OFDM receiver 200.

The received baseband signal 202 is sent into a module 204 which removes the cyclic prefix (CP) from the OFDM symbol (CP removal module). The output of the CP removal module 204 is sent into the system DFT module 206 which transforms the signal from the time domain to the frequency domain.

The signal then goes into a pilot compensation (PC) module 208 which extracts the subcarriers that were used to transmit the reference sequence and also compensates for the known reference signal that was transmitted. Let D represent the vector output of the system DFT module 206 and coming into the PC module 208. Then the output of the PC module 208 can be written as:

$$H_{raw}(i) = \frac{D(i+P_1)}{P(i)}, \quad 0 \leq i \leq N_{REF} - 1 \qquad \text{Equation (1)}$$

where $H_{raw}$ is the output of the PC module 208, $N_{REF}$ is the number of the system DFT subcarriers that are actually occupied by reference symbols, $P_1$ is the location of the first reference symbol in the output of the system DFT. P is a length $N_{REF}$ vector that contains the known reference symbols that were sent from the transmitter (it is assumed that no reference symbol has the value 0). For example, suppose it is known that the transmitter has transmitted 35 reference symbols (vector P) on subcarriers 123 through 157. In this case, $P_1$ would be 123 and $N_{REF}$ would be 35.

In the description within this document, all vectors are assumed to be column vectors unless specified otherwise. Hence, $H_{raw}$ is a vector containing the raw channel estimates. In an ideal system containing no noise, $H_{raw}$ would perfectly represent the channel response between the transmitter and the receiver ($H_{actual}$). However, in a real world system, noise corrupts the channel estimates and filtering is often used to improve the accuracy of the channel estimates.

The channel estimate filter (CEF) 210 module attempts to take advantage of the known a-priori auto-correlation properties of the channel response so as to produce refined channel estimates 212 with improved accuracy. Since the channel responses of nearby subcarriers are usually correlated, filtering can be applied so as to combine adjacent channel estimates to produce a final refined channel estimate vector called $H_{filt}$.

This filtering operation is often designed so that a filter of length (L) is applied to all of the channel estimates. It may or may not be the case that the same length L filter is applied to all channel estimates. This filtering operation can be expressed as a matrix operation as follows:

$$H_{filt} = M_{smooth} H_{raw} \qquad \text{Equation (2)}$$

An example $M_{smooth}$ matrix is shown below for $N_{ref}=12$ and L=5.

Note that in this document, rows and columns are numbered starting from zero. Thus, the upper left coefficient of a matrix is located in row 0 column 0, or (0, 0). The lower right coefficient in the above matrix is located in position ($N_{ref}-1$, $N_{ref}-1$).

In general, if L is odd, the leftmost L entries of the upper (L+1)/2 rows and the rightmost L entries of the lower (L+1)/2 rows will contain coefficients. For rows (L+1)/2 through $N_{ref}-L+1)/2-1$, the coefficient locations of any particular row will be located in the same positions as the non-zero entries of the previous row, but shifted to the right by one position.

If L is even, the leftmost L entries of the upper L/2 rows and the rightmost L entries of the lower L/2+1 rows will contain coefficients. For rows L/2 through $N_{ref}-L/2-2$, the coefficient locations of any particular row will be located in the same positions as the non-zero entries of the previous row, but shifted to the right by one position.

There are many ways in which the $c_{i,j}$ coefficients can be chosen. One manner is to perform simple averaging where each coefficient is equal to 1/L.

Another manner is to first create the autocorrelation matrix of the channel, $R_{H,L}$, of size L×L. Specifically, $$R_{H,L} = \frac{E[H_{actual}(0:L-1)H_{actual}^H(0:L-1)]}{\sigma_s^2} \qquad \text{Equation (4)}$$

where the notation A(a:b) indicates that only elements a through b of vector A are to be retained. All other elements are to be discarded, $\sigma_s^2$ is the average received power of the channel, and the operator $^H$ represents the Hermitian operation.

The well known OFDM channel estimation filtering equation that is based on LMMSE theory is then:

$$M_{ref,L,SNR} = (R_H^{-1} + I \ast SNR)^{-1} SNR \qquad \text{Equation (5)}$$

where $\sigma_n^2$ the average power of the noise introduced by the receiver. SNR is the signal to noise ratio or $$\frac{\sigma_s^2}{\sigma_n^2}.$$

Letting $d_{a,b}$ represent the coefficient in row a, column b of $M_{ref,L,SNR}$, the c coefficients in the previous example can be assigned as:

$$c_{a,b} = d_{a,b} \quad 0 \leq a \leq 1 \quad 0 \leq b \leq 4 \qquad \text{Equation (6)}$$

$$c_{a,b} = d_{2,b} \quad 2 \leq a \leq 9 \quad 0 \leq b \leq 4 \qquad \text{Equation (7)}$$

$$c_{a,b} = d_{a-7,b} \quad 10 \leq a \leq 11 \quad 0 \leq b \leq 4 \qquad \text{Equation (8)}$$

$$M_{smooth} = \begin{bmatrix} c_{0,0} & c_{0,1} & c_{0,2} & c_{0,3} & c_{0,4} & 0 & 0 & 0 & 0 & 0 & 0 & 0 \\ c_{1,0} & c_{1,1} & c_{1,2} & c_{1,3} & c_{1,4} & 0 & 0 & 0 & 0 & 0 & 0 & 0 \\ c_{2,0} & c_{2,1} & c_{2,2} & c_{2,3} & c_{2,4} & 0 & 0 & 0 & 0 & 0 & 0 & 0 \\ 0 & c_{3,0} & c_{3,1} & c_{3,2} & c_{3,3} & c_{3,4} & 0 & 0 & 0 & 0 & 0 & 0 \\ 0 & 0 & c_{4,0} & c_{4,1} & c_{4,2} & c_{4,3} & c_{4,4} & 0 & 0 & 0 & 0 & 0 \\ 0 & 0 & 0 & c_{5,0} & c_{5,1} & c_{5,2} & c_{5,3} & c_{5,4} & 0 & 0 & 0 & 0 \\ 0 & 0 & 0 & 0 & c_{6,0} & c_{6,1} & c_{6,2} & c_{6,3} & c_{6,4} & 0 & 0 & 0 \\ 0 & 0 & 0 & 0 & 0 & c_{7,0} & c_{7,1} & c_{7,2} & c_{7,3} & c_{7,4} & 0 & 0 \\ 0 & 0 & 0 & 0 & 0 & 0 & c_{8,0} & c_{8,1} & c_{8,2} & c_{8,3} & c_{8,4} & 0 \\ 0 & 0 & 0 & 0 & 0 & 0 & 0 & c_{9,0} & c_{9,1} & c_{9,2} & c_{9,3} & c_{9,4} \\ 0 & 0 & 0 & 0 & 0 & 0 & 0 & c_{10,0} & c_{10,1} & c_{10,2} & c_{10,3} & c_{10,4} \\ 0 & 0 & 0 & 0 & 0 & 0 & 0 & c_{11,0} & c_{11,1} & c_{11,2} & c_{11,3} & c_{11,4} \end{bmatrix} \qquad \text{Equation (3)}$$

Other similar or equivalent assignments of coefficients are possible. In general, for odd L, the upper (L+1)/2 rows of $M_{ref,L,SNR}$ are assigned to the upper (L+1)/2 rows of $M_{smooth}$ and the lower (L+1)/2 rows of $M_{ref,L,SNR}$ are assigned to the lower (L+1)/2 rows of $M_{smooth}$. The intermediate rows are all assigned the coefficients of row (L+1)/2−1 of $M_{ref,L,SNR}$. For even L, the upper L/2 rows of $M_{ref,L,SNR}$ are assigned to the upper L/2 rows of $M_{smooth}$ and the lower L/2 rows of $M_{ref,L,SNR}$ are assigned to the lower L/2 rows of $M_{smooth}$. The intermediate rows are all assigned the coefficients of row L/2−1 of $M_{ref,L,SNR}$.

In implementations, the larger the value of L, the more filtering that is possible on the channel estimates and the more noise that can be eliminated from the channel estimates. However, every increase in L can lead to an increased implementation cost.

Figure 3:
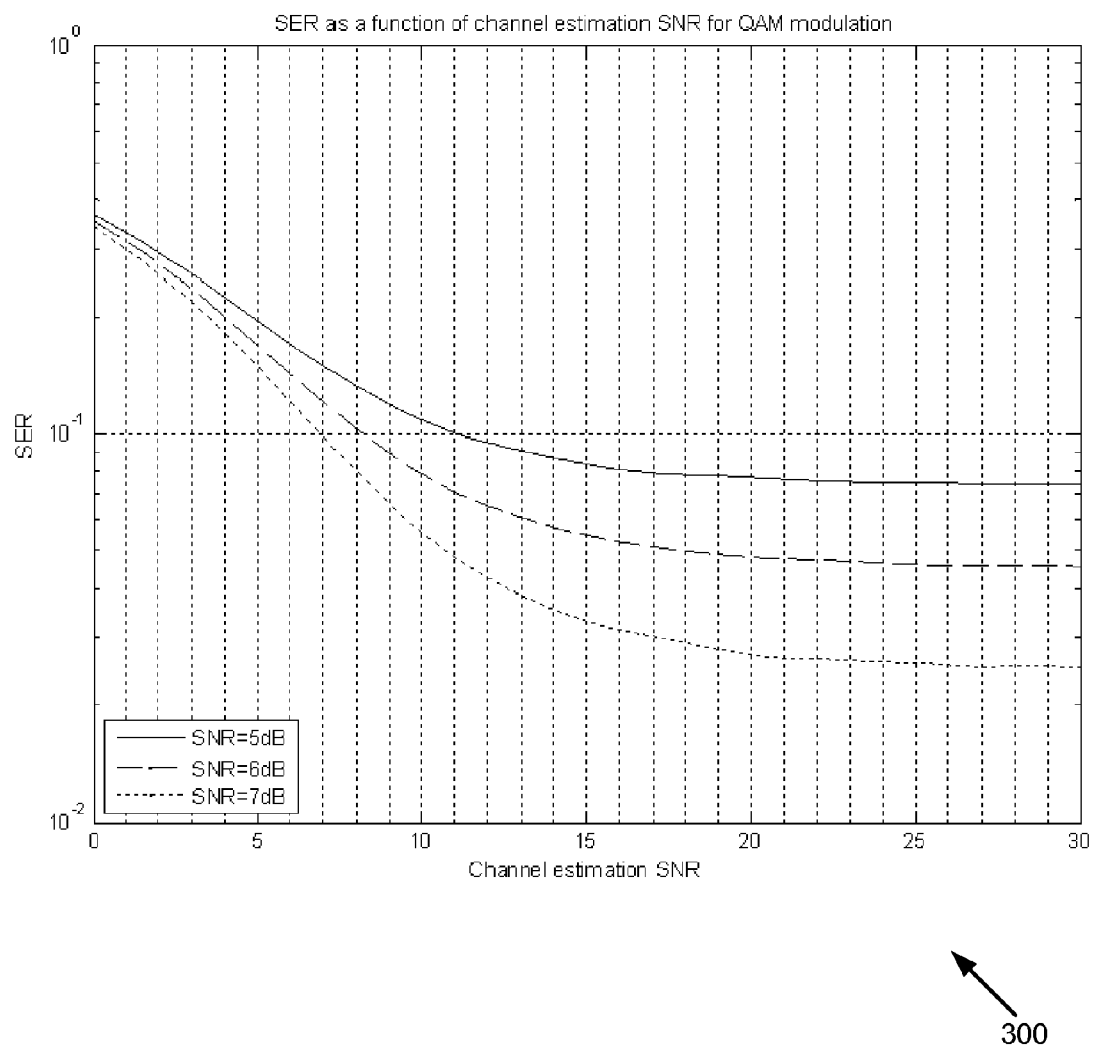
FIG. 3 shows an example of a wireless communication system that may implement an OFDM receiver system in accordance with an embodiment.

FIG. 3 shows an example of the tradeoff between channel estimation signal to noise ratio (SNR) and data SNR of a particular receiver. Different receivers will have different curves and hence the traces 300 in FIG. 3 are presented only as examples. Furthermore, different receivers will have different performance targets. For example, one receiver's performance target may be a symbol error rate (SER) of 10%. SER rates better (smaller) than 10% do not result in increased performance for the receiver. Another receiver's performance target may be a particular block error rate (BLER). Performance better than the target BLER may not result in a system with increased overall performance.

As an example, suppose that the signal is being received with an SNR of 5 dB both during the transmission of the reference symbols and also during the transmission of the data. According to the plot, if the data SNR ($SNR_{DATA}$) is 5 dB (solid trace), the channel estimation SNR ($SNR_{CE,required}$) needs to be about 11 dB so as to ensure that the SER of the QAM symbols will be about $10^{-1}$. The channel estimates, when they are received, have an SNR of 5 dB ($SNR_{CE,raw}$=5 dB) (in this case, equal to the data SNR) and hence require a substantial amount of filtering so that after smoothing, their SNR is 11 dB.

Receivers are usually designed to handle the worst case, which, for the current example, is a 5 dB $SNR_{CE,raw}$ and $SNR_{DATA}$. If $SNR_{CE,raw}$ and $SNR_{DATA}$ were, for example, 4 dB, no amount of channel estimate filtering could ever produce an SER better than $10^{-1}$. The filter length, L, would be chosen such that even if $SNR_{CE,raw}$ and $SNR_{DATA}$ were 5 dB, the channel estimates would be improved to 11 dB such that reception would be possible.

In many cases, filtering resources are wasted. For example, if the $SNR_{CE,raw}$ and $SNR_{DATA}$ were 7 dB, the same length L filter would be applied to the channel estimates thereby improving the SNR of the channel estimates to some value better than 7 dB, perhaps even as much as 12 dB. However, by examining the dotted trace in the figure, one sees that actually, if $SNR_{DATA}$ is 7 dB, the SNR required on the smoothened channel estimates ($SNR_{CE,required}$) so as to achieve a $10^{-1}$ SER is also 7 dB. Thus, actually, in this case, there is no need to perform any channel estimate filtering at all. Thus, filtering channel estimates would waste resources and would not result in an overall increase in performance.

Figure 4:
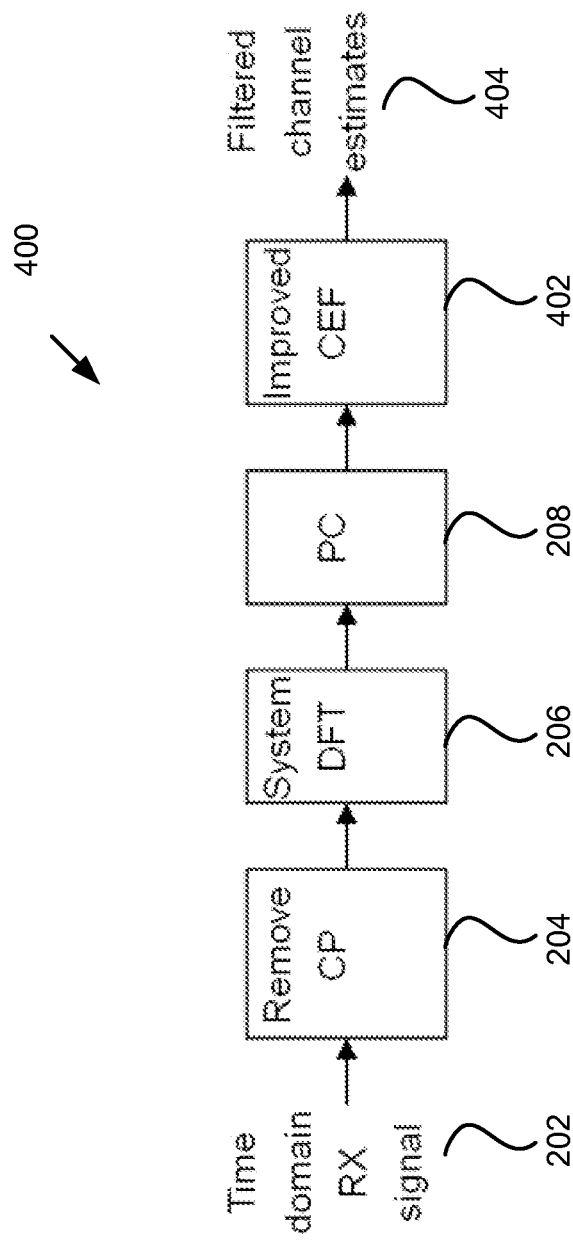
FIG. 4 is a diagram illustrating an exemplary OFDM receiver system.

FIG. 4 is a diagram illustrating an exemplary OFDM receiver system 400 in accordance with an embodiment. The received baseband signal 202 is sent into a module 204 which removes the cyclic prefix (CP) from the OFDM symbol. The output of this module 204 is sent into the system DFT 206 which transforms the signal from the time domain to the frequency domain.

The signal then goes into a pilot compensation (PC) module 208 which extracts the subcarriers that were used to transmit the reference sequence and also compensates for the known reference signal that was transmitted. Let D represent the vector coming out of the system DFT module 206 and coming into the PC module 208.

$$H_{raw}(i) = \frac{D(i+P_1)}{P(i)}, 0 \leq i \leq N_{REF} - 1 \qquad \text{Equation (9)}$$

$H_{raw}$ is the output of the PC module 208. $N_{REF}$ is the number of the system DFT subcarriers that are actually occupied by reference symbols. $P_1$ is the location of the first reference symbol in the output of the system DFT 206. P is a length $N_{REF}$ vector that contains the known reference symbols that were sent from the transmitter (it is assumed that no reference symbol has the value 0). For example, suppose it is known that the transmitter has transmitted 35 reference symbols (vector P) on subcarriers 123 through 157. In this case, $P_1$ would be 123 and $N_{REF}$ would be 35.

Put simply, $H_{raw}$ is a vector containing the raw channel estimates. In an ideal system containing no noise, $H_{raw}$ would perfectly represent the channel response between the transmitter and the receiver ($H_{actual}$). However, in a real world system, noise corrupts the channel estimates and filtering is often used to improve the accuracy of the channel estimates.

The system 400 operates by first estimating the received signal power $\hat{\sigma}_s^2$ and the received noise power $\hat{\sigma}_n^2$. Several techniques are available to estimate the noise power. One technique is to take advantage of transmission gaps from the transmitter. If the transmitter stops transmitting for even one OFDM symbol, the signal going through the receiver is composed completely of noise. Hence, the receiver can estimate the total received power during the transmission gap which, in this case, would be equal to the received noise power.

As another example, in a receiver which is not subject to interference noise, the receiver may be pre-calibrated and hence the receiver noise power may be known in advance. The total received noise may even be a function of temperature and this function may also be known in advance.

One manner in which the received signal power can be estimated is by using estimates of the received noise power. If the total noise power has already been estimated, the receiver can then estimate the total received power (including both noise and signal). The received signal power can be extracted by subtracting the received noise power estimate from the received total power estimate.

As another example, if the filtered channel estimates from a different transmission from the same transmitter are available, these channel estimates can be used to estimate the received signal power during the previous transmission from that transmitter. If it can be assumed that the current transmission will be received with a signal power similar to the signal power used during the previous transmission, then the previous received signal power can be used as an estimate of the received signal power for the current transmission.

The system 400 may construct various filters 602 that will be used to smooth the raw channel estimates as to produce refined channel estimates 604 with improved accuracy. As before, these filters may be represented as matrices. For a given $N_{ref}$, the system 400 may be able to construct the matrix $M_{L,S}$ which is the matrix to be used to filter the channel estimates when the SNR is equal to S. L represents the number of multiplications used per filtered channel estimate. As before, for a given L value, the $M_{L,S}$ matrix may have the form shown in the equation below. In other words, each row may have at most L non-zero coefficients arranged in a mostly diagonal pattern, as shown below.

$$M_{L,S} = \begin{bmatrix} c_{0,0} & c_{0,1} & c_{0,2} & c_{0,3} & c_{0,4} & 0 & 0 & 0 & 0 & 0 & 0 & 0 \\ c_{1,0} & c_{1,1} & c_{1,2} & c_{1,3} & c_{1,4} & 0 & 0 & 0 & 0 & 0 & 0 & 0 \\ c_{2,0} & c_{2,1} & c_{2,2} & c_{2,3} & c_{2,4} & 0 & 0 & 0 & 0 & 0 & 0 & 0 \\ 0 & c_{3,0} & c_{3,1} & c_{3,2} & c_{3,3} & c_{3,4} & 0 & 0 & 0 & 0 & 0 & 0 \\ 0 & 0 & c_{4,0} & c_{4,1} & c_{4,2} & c_{4,3} & c_{4,4} & 0 & 0 & 0 & 0 & 0 \\ 0 & 0 & 0 & c_{5,0} & c_{5,1} & c_{5,2} & c_{5,3} & c_{5,4} & 0 & 0 & 0 & 0 \\ 0 & 0 & 0 & 0 & c_{6,0} & c_{6,1} & c_{6,2} & c_{6,3} & c_{6,4} & 0 & 0 & 0 \\ 0 & 0 & 0 & 0 & 0 & c_{7,0} & c_{7,1} & c_{7,2} & c_{7,3} & c_{7,4} & 0 & 0 \\ 0 & 0 & 0 & 0 & 0 & 0 & c_{8,0} & c_{8,1} & c_{8,2} & c_{8,3} & c_{8,4} & 0 \\ 0 & 0 & 0 & 0 & 0 & 0 & 0 & c_{9,0} & c_{9,1} & c_{9,2} & c_{9,3} & c_{9,4} \\ 0 & 0 & 0 & 0 & 0 & 0 & 0 & c_{10,0} & c_{10,1} & c_{10,2} & c_{10,3} & c_{10,4} \\ 0 & 0 & 0 & 0 & 0 & 0 & 0 & c_{11,0} & c_{11,1} & c_{11,2} & c_{11,3} & c_{11,4} \end{bmatrix} \quad \text{Equation (10)}$$

Other similar or equivalent arrangements of coefficients are possible. In general, if L is odd, the leftmost L entries of the upper (L+1)/2 rows and the rightmost L entries of the lower (L+1)/2 rows may contain coefficients. For rows (L+1)/2 through $N_{ref}$−(L+1)/2−1, the coefficient locations of any particular row may be located in the same positions as the non-zero entries of the previous row, but shifted to the right by one position.

If L is even, the leftmost L entries of the upper L/2 rows and the rightmost L entries of the lower L/2+1 rows may contain coefficients. For rows L/2 through $N_{ref}$−L/2−2, the coefficient locations of any particular row may be located in the same positions as the non-zero entries of the previous row, but shifted to the right by one position.

There are many ways to generate the coefficients for these matrices. One simple manner is to ignore the SNR value and perform simple averaging of all the raw channel estimates. In this case, the non-zero coefficients are 1/L regardless of the SNR.

Another manner is to first create the autocorrelation matrix of the channel, $R_{H,L}$, of size L×L. Specifically, $$R_{H,L} = \frac{E[H_{actual}(0:L-1)H_{actual}^H(0:L-1)]}{\sigma_s^2} \quad \text{Equation (11)}$$

where the notation A(a:b) indicates that only elements a through b of vector A are to be retained. All other elements are to be discarded. $\sigma_s^2$ is the average received power of the channel.

The well known OFDM channel estimation filtering equation that is based on LMMSE theory is then:

$$M_{ref,L,SNR} = (R_H^{-1} + I*SNR)^{-1} SNR \quad \text{Equation (12)}$$

where $\sigma_n^2$ is the average power of the noise introduced by the receiver. SNR is the signal to noise ratio or $$\frac{\sigma_s^2}{\sigma_n^2}.$$

Letting $d_{a,b}$ represent the coefficient in row a, column b of $M_{ref,L,SNR}$, the c coefficients in the previous example may be assigned as:

$$c_{a,b} = d_{a,b} \quad 0 \leq a \leq 1 \quad 0 \leq b \leq 4 \quad \text{Equation (13)}$$

$$c_{a,b} = d_{2,b} \quad 2 \leq a \leq 9 \quad 0 \leq b \leq 4 \quad \text{Equation (14)}$$

$$c_{a,b} = d_{a-7,b} \quad 10 \leq a \leq 11 \quad 0 \leq b \leq 4 \quad \text{Equation (15)}$$

Other similar or equivalent assignments of coefficients are possible. In general, for odd L, the upper (L+1)/2 rows of $M_{ref,L,SNR}$ are assigned to the upper (L+1)/2 rows of $M_{smooth}$ and the lower (L+1)/2 rows of $M_{ref,L,SNR}$ are assigned to the lower (L+1)/2 rows of $M_{smooth}$. The intermediate rows are all assigned the coefficients of row (L+1)/2−1 of $M_{ref,L,SNR}$. For even L, the upper L/2 rows of $M_{ref,L,SNR}$ are assigned to the upper L/2 rows of $M_{smooth}$ and the lower L/2 rows of $M_{ref,L,SNR}$ are assigned to the lower L/2 rows of $M_{smooth}$. The intermediate rows are all assigned the coefficients of row L/2−1 of $M_{ref,L,SNR}$.

Furthermore, for each $M_{L,S}$ matrix, the system 200 may determine how much of a channel estimation SNR improvement may be produced by that particular matrix. This is represented by the variable $G_{L,S}$. For example, for $M_{5,10\,dB}$ it may be that $G_{5,10\,dB}$ is equal to 5 dB. This means that if raw channel estimates are received with an $SNR_{CE,raw}$ of 10 dB and these channel estimates are filtered using 5 coefficients per filtered channel estimate according to matrix $M_{5,10\,dB}$, the SNR of the channel estimates after filtering ($SNR_{CE,smooth}$) is improved by 5 dB. In this case, the channel estimates has a $SNR_{CE,smooth}$ of 15 dB.

These $G_{L,S}$ constants may be calculated through the use of simulations. However, these constants may be monotonically non-decreasing in the parameter L as long as S is held constant. That is, for a particular received SNR value, as L is increased and more and more raw channel estimates are combined to produce a filtered channel estimate, the filtered channel estimate may have better and better noise properties. It is also expected, however, that the benefits of increasing L may decrease as L becomes bigger and bigger. For example, if L changes from 1 to 4, it is expected that $G_{L,S}$ may increase much more than if L changes from 11 to 14.

For many OFDM receivers, such as those used in an LTE uplink, key parameters of the transmission are known by the receiver in advance of the actual transmission. For example, in the LTE uplink, the receiver knows the modulation that is used, the coding rate that is used, the number of subcarriers that are used, and the offset between the power of the reference symbols and the power of the data.

Figure 5:
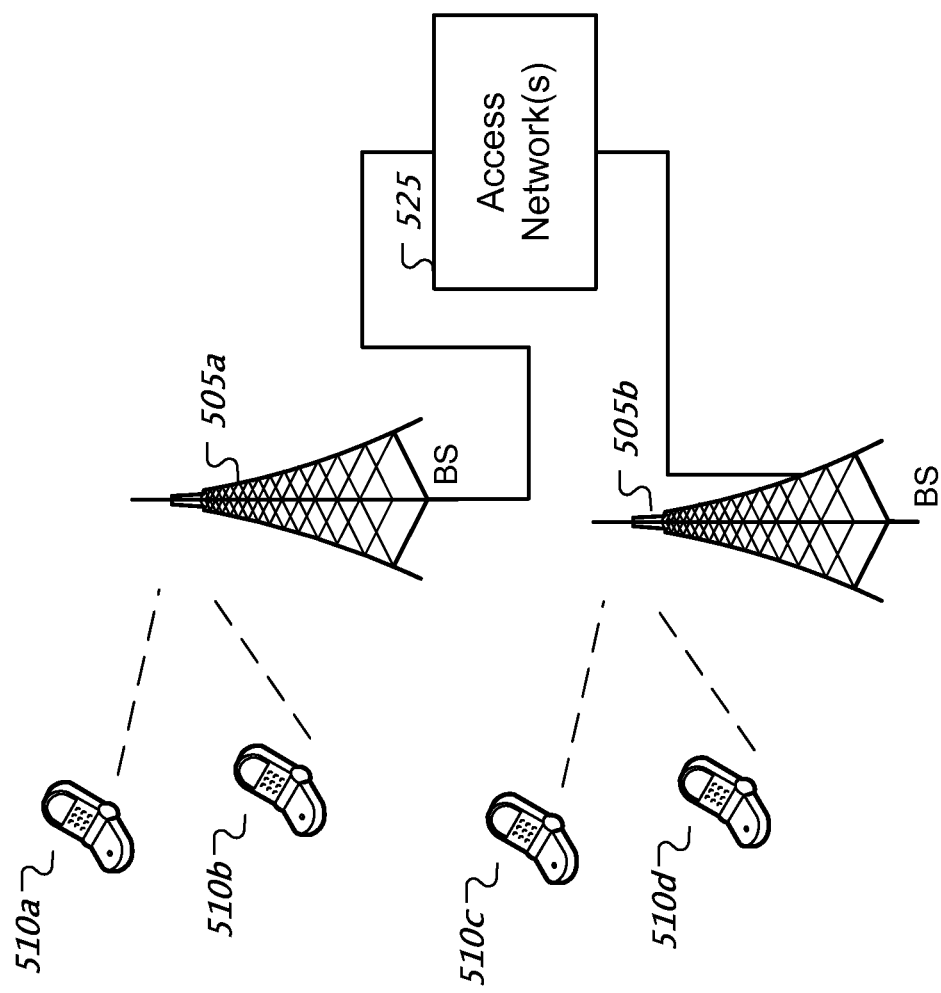
FIG. 5 is a graph illustrating exemplary SER as a function of data SNR and channel estimation SNR.

Based on these key parameters, the receiver can generate plots similar to those in FIG. 5. For a specific configuration of the key transmission parameters, one plot can be created that relates $SNR_{CE,raw}$ and $SNR_{DATA}$ to some required system performance metric. The plots in FIG. 5 indicate the SER for a particular combination of $SNR_{CE,raw}$ and $SNR_{DATA}$ for a particular configuration of the key transmission parameters. Different systems have different performance metrics. For example, some systems may have a performance metric measured as the BLER. In most communications systems, there is a minimum performance requirement and there is no need for the system to perform better than this minimum requirement.

For each unique combination of transmission parameters there is a different plot associating $SNR_{CE,raw}$ and $SNR_{DATA}$ with the system performance measure.

Based on the $SNR_{DATA}$, the system 400 may examine the performance data, such as plots, and determine the $SNR_{CE,required}$ that satisfies the performance requirements of the receiver.

The system 400 may then compare the $SNR_{CE,required}$ with the $SNR_{CE,raw}$. If $SNR_{CE,raw}$ exceeds $SNR_{CE,required}$, there is nothing to be done and no channel estimate filtering is performed. In this case, even without performing any filtering on the channel estimates, the receiver can meet the performance target.

Most often, however, some amount of channel estimate filtering is required. The system 200 may then examine the $G_{L,S}$ curve and attempt to find the minimum value of L such that the SNR after filtering ($SNR_{CE,smooth}$) is sufficient to satisfy the performance requirements of the receiver.

Sometimes, however, $SNR_{CE,raw}$ is so low that no amount of filtering will allow the receiver to properly receive the signal. In this case, the best strategy may be to simply give up and not even bother attempting to demodulate the data.

One advantage is that the system 400 may only use resources as necessary to filter the channel estimates. In cases where the received signal has a high SNR, this system 400 uses relatively few resources to demodulate the transmitted data. As the SNR decreases, the system 400 uses progressively more and more resources to demodulate the data, but never more resources than are necessary. This is a clear improvement over a receiver that always filters the channel estimates with a fixed length filter. Such a receiver would often perform more filtering than was absolutely necessary, thereby wasting resources.

Another embodiment is applicable when multiple transmitters share the same OFDM link with a single receiver. The transmitters are usually separated in the frequency domain where different transmitters are scheduled to transmit on different subcarriers.

During the reception of a particular OFDM symbol, this embodiment first treats each transmitter independently according to the previous embodiment. For example, if 3 transmitters $T_1$, $T_2$, and $T_3$ are being received during a particular OFDM symbol, the optimal matrix $M_{L,S}$ is chosen for each transmitter based on the previously described embodiment. This results in three matrices $M_{L_1,S_1}$, $M_{L_2,S_2}$, and $M_{L_3,S_3}$ to be used to smooth the channel estimates received from each transmitter.

It is expected that the number of resources required to filter the channel estimates from each transmitter may vary. This means that $L_1$, $L_2$, and $L_3$ may have different values. An OFDM receiver may often have a fixed amount of resources dedicated to channel estimation filtering for all transmitters for each OFDM symbol. It may be that during a particular OFDM symbol, the number of resources available are sufficient to perform filtering with all 3 matrices.

However, at times, it may be the case that several transmitters are received with a low SNR requiring large L values for every transmitter. In such a situation, there may not be enough resources available to filter the channel estimates for all the transmitters. In such a situation, a resource scheduler can be used to decide how many resources to allocate to the smoothing of the channel estimates for each transmitter.

If resources are lacking to adequately filter all the channel estimates, one strategy may be to reduce the L values of all the transmitters thereby reducing the total amount of resources required to filter all the estimates from all the transmitters. For example, one can reduce the L values by 10% (while still making sure that no L value goes below 1), and see if enough resources are available to filter the channel estimates with the new L values. If not, the L values can be reduced by another 10% to see if the resource requirements have been sufficiently reduced. This process can continue until the resource requirements have been reduced to the point that the available resources would be sufficient.

The drawback with the above resource scheduling strategy is that by reducing the L values, the performance metric of all the transmissions may drop below the minimum performance requirement of the receiver. For example, if a set of L values has been chosen so as to result in a 10% SER for all transmitters, any reduction in L values may result in all transmitters having a performance worse than 10% SER.

An alternative strategy is to simply drop one of the transmissions. If the available resources are not sufficient to allow every transmission to have an adequate performance metric, then, one can simply discard one of the transmissions. In this situation, the discarded transmission may not be received but the remaining transmissions may all be able to satisfy the minimum performance requirement of the receiver.

Several strategies can be used to select the transmission to be dropped. One strategy is to drop the transmission with the smallest resource requirements. Transmissions may be dropped continuously until the required amount of resources is lower than the available amount of resources.

Alternatively, one can start by dropping the transmission with the largest resource requirements. Transmissions may be dropped continuously until the required amount of resources is lower than the available amount of resources.

Alternatively, a priority can be assigned to each transmission. For example, emergency transmissions can be assigned a high priority and other types of transmissions can be assigned lower priorities. The lowest priority transmissions may be dropped first. Transmissions may be dropped continuously until the required amount of resources is lower than the available amount of resources.

FIG. 5 shows an example of a wireless communication system. A wireless communication system can include one or more base stations (BSs) 505a, 505b, one or more wireless devices 510 and an access network 525. A base stations 505 can provide wireless service to wireless devices 510 in one or more wireless sectors. In some implementations, a base station 505a, 505b includes directional antennas to produce two or more directional beams to provide wireless coverage in different sectors.

The access network 525 can communicate with one or more base stations 505, 505b. In some implementations, the access network 525 includes one or more base stations 505, 505b. In some implementations, the access network 525 is in communication with a core network (not shown in FIG. 5) that provides connectivity with other wireless communication systems and wired communication systems. The core network may include one or more service subscription databases to store information related to the subscribed wireless devices 510. A first base station 505 can provide wireless service based on a first radio access technology, whereas a second base station 505 can provide wireless service based on a second radio access technology. The base stations 505 may be co-located or may be separately installed in the field according to the deployment scenario. The access network 525 can support multiple different radio access technologies.

Various examples of wireless communication systems and access networks that can implement the present techniques and systems include, among others, wireless communication systems based Code Division Multiple Access (CDMA) such as CDMA2000 1x, High Rate Packet Data (HRPD), evolved HRPD (eHRPD), Universal Mobile Telecommunications System (UMTS), Universal Terrestrial Radio Access Network (UTRAN), Evolved UTRAN (E-UTRAN), Long-Term Evolution (LTE), and Worldwide Interoperability for Microwave Access (WiMAX). In some implementations, a wireless communication system can include multiple networks using different wireless technologies. A dual-mode or multi-mode wireless device includes two or more wireless technologies that could be used to connect to different wireless networks. In some implementations, a wireless device can support Simultaneous Voice-Data Operation (SV-DO).

Figure 6:
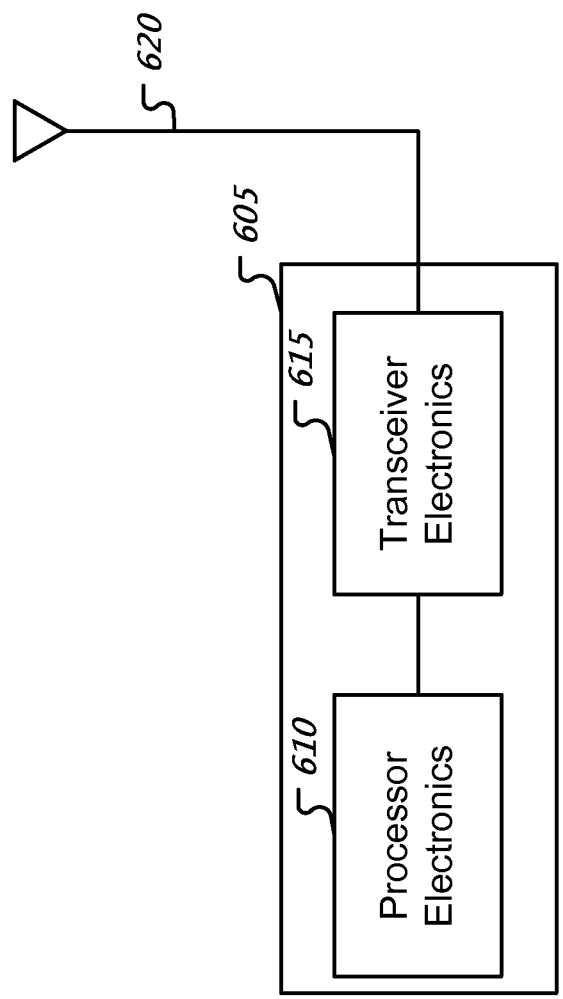
FIG. 6 is a diagram illustrating an exemplary OFDM receiver system in accordance with an embodiment.

FIG. 6 is a block diagram representation of a portion of a radio station 605. A radio station 605 such as a base station or a wireless device can include processor electronics 610 such as a microprocessor that implements one or more of the wireless techniques presented in this document. The radio station 605 can include transceiver electronics 615 to send and/or receive wireless signals over one or more communication interfaces such as antenna 620. The radio station 605 can include other communication interfaces for transmitting and receiving data. Radio station 605 can include one or more memories configured to store information such as data and/or instructions. In some implementations, the processor electronics 610 can include at least a portion of the transceiver electronics 615.

FIG. 7 is a flow chart representation of a wireless communications process 700. The process may be implemented in an OFDM receiver, such as a UE or a base station. At 702, a plurality of reference signals is received on a plurality of subcarriers. At 704, channel estimation is performed to obtain a plurality of raw channel estimates, based on the received plurality of reference signals. At 706, a number of raw channel estimates to be used for channel estimate refinement is determined. At 708, a refined channel estimate is calculated using the number of raw channel estimates from the plurality of raw channel estimates. As previously discussed, in some implementations, the operation of determining the number of raw channel estimates includes determining the number using an SNR criterion. For example, in some implementations, a priori calculations are performed to establish a relation between the number of raw channel estimates and an SNR improvement that can be obtained when that number of raw channel estimates are used in the refinement operation. In some implementations, the number of raw channel estimates are filtered (e.g., using a linear averaging filter) to obtain refined channel estimates.

FIG. 8 is a block diagram representation of a portion of a wireless communications apparatus 800. The module 802 (e.g., a receiver module) is for receiving a plurality of reference signals on a plurality of subcarriers. The module 804 (e.g., a channel estimation module) is for performing channel estimation to obtain a plurality of raw channel estimates based on the received plurality of reference signals. The module 806 (e.g., a channel estimation filter module) is for determining a number of raw channel estimates to be used for a channel estimate refinement. The module 808 (e.g., a channel estimation refinement module) is for calculating a refined channel estimate using the number of raw channel estimates from the plurality of raw channel estimates. The apparatus 800 and modules 802, 804, 806 and 808 may further be configured to implement one or more techniques discussed in this patent document.

Figure 9:
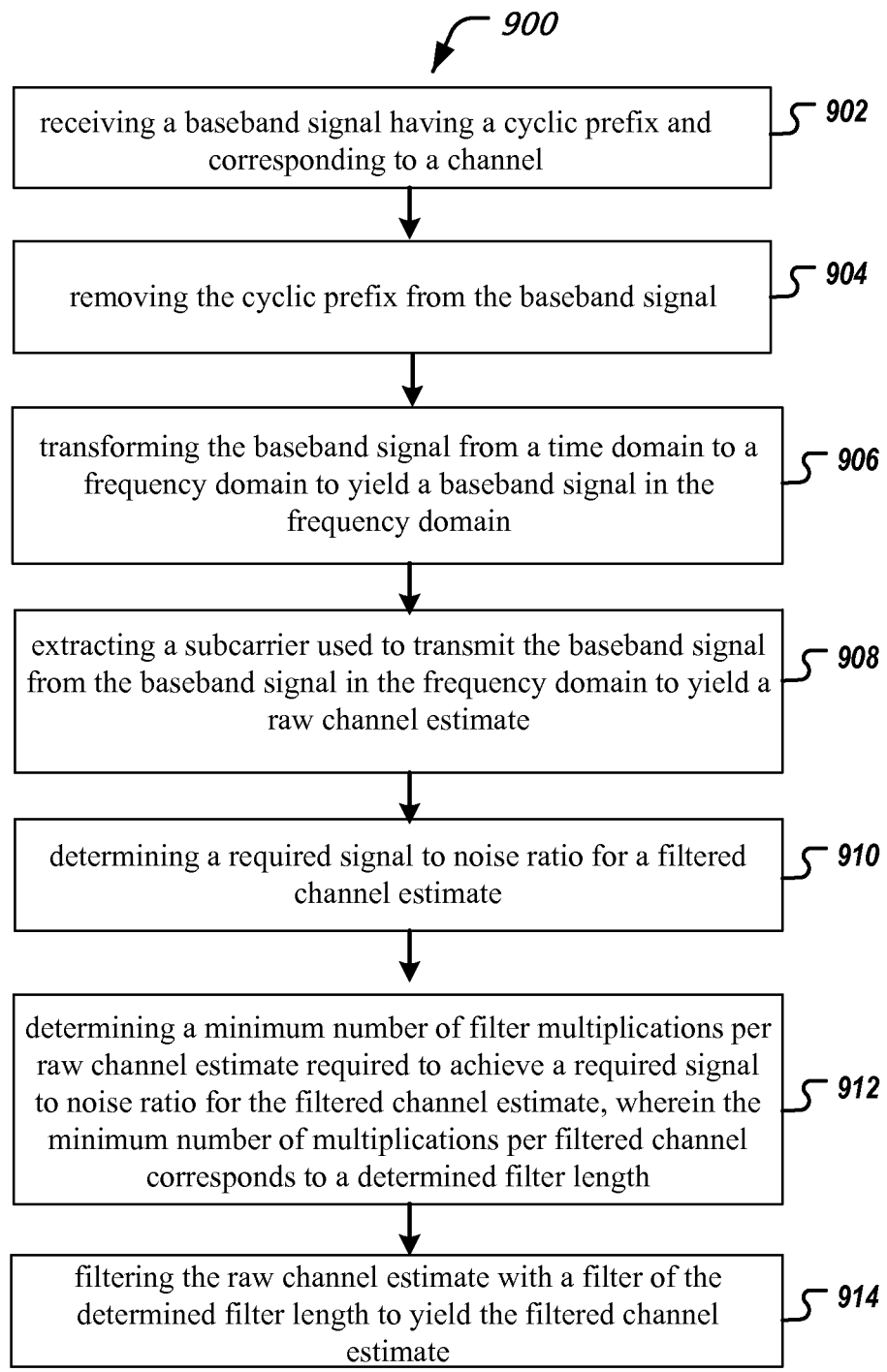
FIG. 9 is a flowchart representation of a method of obtaining a channel estimate in a receiver.

FIG. 9 is a flow chart representation of a method 900 of obtaining a channel estimate in a receiver. At 902, a baseband signal having a cycle prefix and corresponding to a channel is received. At 904, the cyclic prefix is removed from the baseband signal. At 906, the baseband signal is transformed from a time domain to a frequency domain to yield a baseband signal in the frequency domain. At 908, a subcarrier used to transmit the baseband signal is extracted from the baseband signal in the frequency domain to yield a raw channel estimate. At 910, a required signal to noise ratio for a filtered channel estimate is determined. At 912, a minimum number of filter multiplications per raw channel estimate is determined, which is required to achieve a required signal to noise ratio for the filtered channel estimate. The minimum number of multiplications per filtered channel corresponds to a determined filter length. At 914, the raw channel estimate is filtered with a filter of the determined filter length to yield the filtered channel estimate.

Figure 10:
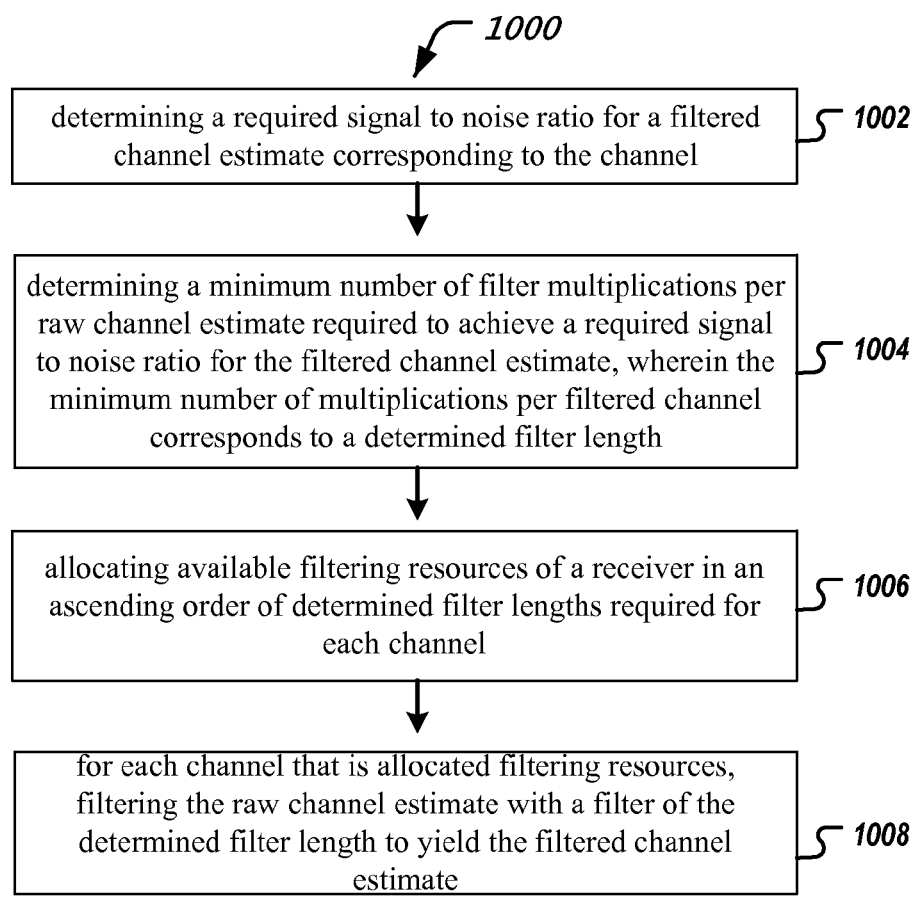
FIG. 10 is a flowchart representation of a method of allocating filtering resources in a receiver.

FIG. 10 is a flow chart representation of a method 1000 of allocating filtering resources in a receiver. At 1002, for each of a plurality of channels, a required signal to noise ratio for a filtered channel estimate corresponding to the channel is determined. At 1004, a minimum number of filter multiplications per raw channel estimate is determined, which is required to achieve a required signal to noise ratio for the filtered channel estimate, wherein the minimum number of multiplications per filtered channel corresponds to a determined filter length. At 1006, available filtering resources of a receiver are allocated in an ascending order of determined filter lengths required for each channel. At 1008, for each channel that is allocated filtering resources, the raw channel estimate is filtered with a filter of the determined filter length to yield the filtered channel estimate.

It will be appreciated that several techniques are described for performing channel estimation in an OFDM receiver are disclosed. In one aspect, techniques are described to select an appropriate channel estimation refinement technique. In some implementations, the number of subcarrier raw channel estimates, that may be used to calculate a refined channel estimate, is determined using operations conditions such as signal and noise powers. In some implementations, raw channel estimates obtained in the frequency band of each individual subcarrier may be linearly combined (e.g., averaging) to obtain a refined channel estimate.

The disclosed and other embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few examples and implementations are disclosed. Variations, modifications, and enhancements to the described examples and implementations and other implementations can be made based on what is disclosed.

What is claimed is:

1. A method of performing channel estimation in an orthogonal frequency domain multiplexing (OFDM) communications system, the method comprising:
   receiving a plurality of reference signals on a plurality of subcarriers;
   performing channel estimation to obtain a plurality of raw channel estimates based on the received plurality of reference signals;
   determining whether a channel estimate filtering refinement is necessary based on a signal to noise ratio (SNR) measurement of the received plurality of reference signals;
   determining, if the channel estimate filtering refinement is determined to be necessary, a minimum value of a filter length for the channel estimation filtering refinement; and
   calculating a refined channel estimate using a number of raw channel estimates of the determined minimum value of the filter length from the plurality of raw channel estimates.

2. The method recited in claim 1, wherein the operation of performing channel estimation includes performing channel estimation in a frequency domain.

3. The method recited in claim 1, wherein the operation of calculating the plurality of raw channel estimates includes calculating the plurality of raw channel estimates by filtering the raw channel estimates with a filter of the determined minimum value of the filter length.

4. The method recited in claim 3, wherein the filtering the raw channel estimates includes averaging the number of raw channel estimates.

5. The method of claim 1, wherein the determining whether a channel estimate filtering is necessary includes comparing a required SNR in the channel estimation with an SNR in the raw channel estimates.

6. The method of claim 1, wherein the determining of the minimum value of the filter length includes determining a minimum number of filter multiplications per raw channel estimate required to achieve the required SNR improvement.

7. An apparatus for performing channel estimation in an orthogonal frequency domain multiplexing (OFDM) communications system, the apparatus comprising:
   a receiver module that receives a plurality of reference signals on a plurality of subcarriers;
   a channel estimation module that performs channel estimation to obtain a plurality of raw channel estimates based on the received plurality of reference signals;
   a module that determines whether a channel estimate filtering refinement is necessary based on a signal to noise ratio (SNR) measurement of the received plurality of reference signals;
   a module that determines, if the channel estimate filtering refinement is determined to be necessary, a minimum value of a filter length for the channel estimation filtering refinement; and
   a channel estimation refinement module that provides a refined channel estimate using a number of raw channel estimates of the determined minimum value of the filter length from the plurality of raw channel estimates.

8. The apparatus recited in claim 7, wherein the channel estimation module is operable to perform channel estimation in a frequency domain.

9. The apparatus recited in claim 7, wherein the channel estimation module includes a filtering module that produces the plurality of raw channel estimates by filtering the raw channel estimates with a filter of the determined minimum value of the filter length.

10. The apparatus recited in claim 9, wherein the filtering the raw channel estimates includes averaging the number of raw channel estimates.

11. The apparatus of claim 7, wherein the channel estimation filter module compares a required SNR in the channel estimation with an SNR in the raw channel estimates.

12. The apparatus of claim 7, wherein the channel estimation filter module determines a minimum number of filter multiplications per raw channel estimate required to achieve the required SNR improvement.

13. A computer program product comprising a non-volatile computer readable medium having computer executable instructions stored thereon, the instructions comprising code for facilitating:
receiving a plurality of reference signals on a plurality of subcarriers;
performing channel estimation to obtain a plurality of raw channel estimates based on the received plurality of reference signals;
determining whether a channel estimate filtering refinement is necessary based on a signal to noise ratio (SNR) measurement of the received plurality of reference signals;
determining, if the channel estimate filtering refinement is determined to be necessary, a minimum value of a filter length for the channel estimation filtering refinement; and
calculating a refined channel estimate using a number of raw channel estimates of the determined minimum value of the filter length from the plurality of raw channel estimates.

14. A method of obtaining a channel estimate in a receiver, comprising:
receiving a baseband signal having a cyclic prefix and corresponding to a channel;
removing the cyclic prefix from the baseband signal;
transforming the baseband signal from a time domain to a frequency domain to yield a baseband signal in the frequency domain;
extracting a subcarrier used to transmit the baseband signal from the baseband signal in the frequency domain to yield a raw channel estimate;
determining a required signal to noise ratio for a filtered channel estimate;
determining a minimum number of filter multiplications per raw channel estimate required to achieve a required signal to noise ratio for the filtered channel estimate, wherein the minimum number of multiplications per filtered channel corresponds to a determined filter length; and
filtering the raw channel estimate with a filter of the determined filter length to yield the filtered channel estimate.

15. A method of allocating filtering resources in a receiver, comprising:
for each of a plurality of channels:
determining a required signal to noise ratio for a filtered channel estimate corresponding to the channel;
determining a minimum number of filter multiplications per raw channel estimate required to achieve a required signal to noise ratio for the filtered channel estimate, wherein the minimum number of multiplications per filtered channel corresponds to a determined filter length; and
allocating available filtering resources of a receiver in an ascending order of determined filter lengths required for each channel; and
for each channel that is allocated filtering resources, filtering the raw channel estimate with a filter of the determined filter length to yield the filtered channel estimate.

16. A receiver, comprising:
an antenna operable to receive a baseband signal having a cyclic prefix and corresponding to a channel; and
a processor in communication with the antenna, the processor operable to:
remove the cyclic prefix from the baseband signal;
transform the baseband signal from a time domain to a frequency domain to yield a baseband signal in the frequency domain;
extract a subcarrier used to transmit the baseband signal from the baseband signal in the frequency domain to yield a raw channel estimate;
determine a required signal to noise ratio for a filtered channel estimate;
determine a minimum number of filter multiplications per raw channel estimate required to achieve a required signal to noise ratio for the filtered channel estimate, wherein the minimum number of multiplications per filtered channel corresponds to a determined filter length; and
filter the raw channel estimate with a filter of the determined filter length to yield the filtered channel estimate.

17. A communication system based on orthogonal frequency domain multiplexing (OFDM) comprising:
a network of base stations that are spatially distributed in a service area to form a radio access network for wireless communication devices,
wherein each base station includes:
a receiver module that receives a plurality of reference signals on a plurality of subcarriers;
a channel estimation module that performs channel estimation to obtain a plurality of raw channel estimates based on the received plurality of reference signals;
a channel estimation filter module that determines whether a channel estimate filtering is necessary based on a required signal to noise ratio (SNR) improvement that is produced by the channel estimate filtering; and
a channel estimation refinement module that provides a refined channel estimate using the determined filter length,
wherein the channel estimation filter module determines, if the channel estimate filtering is determined necessary, a minimum value of a filter length required to achieve the required SNR improvement for the filtered channel estimate.

* * * * *